(12) United States Patent
Liu et al.

(10) Patent No.: US 8,648,480 B1
(45) Date of Patent: Feb. 11, 2014

(54) ENERGY HARVESTING SYSTEM USING FLOW-INDUCED VIBRATIONS

(75) Inventors: Wayne P. Liu, San Diego, CA (US); Richard L. Waters, San Diego, CA (US); Hugo F. Jazo, San Diego, CA (US); Brian B. Dick, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 11 days.

(21) Appl. No.: 13/532,607

(22) Filed: Jun. 25, 2012

(51) Int. Cl.
 *H02K 7/20* (2006.01)
(52) U.S. Cl.
 USPC .............................................................. 290/8
(58) Field of Classification Search
 USPC .......... 290/1 R, 1 A, 43, 54, 8; 310/36, 22, 15
 IPC ...................................................... H01K 35/00
 See application file for complete search history.

(56) References Cited

U.S. PATENT DOCUMENTS

| | | | | |
|---|---|---|---|---|
| 6,153,944 | A * | 11/2000 | Clark | 290/54 |
| 7,091,628 | B1 * | 8/2006 | Balt | 290/54 |
| 7,493,759 | B2 | 2/2009 | Bernitsas et al. | |
| 7,633,175 | B1 * | 12/2009 | Wilson et al. | 290/43 |
| 7,906,861 | B2 | 3/2011 | Guerrero et al. | |
| 2008/0277941 | A1 * | 11/2008 | Bowles et al. | 290/54 |
| 2010/0109331 | A1 * | 5/2010 | Hedtke et al. | 290/54 |
| 2010/0308599 | A1 | 12/2010 | Pabon et al. | |

OTHER PUBLICATIONS

Bezanson, J. et al., "Utilizing Deep Ocean Currents to Power Extended Duration Sensors", IEEE Oceans 2010 Conference, Sep. 20-23, 2010, pp. 1-8.
Jung, H. et al., "Feasibility Study on a New Energy Harvesting Electromagnetic Device Using Aero Dynamic Instability", IEEE Transactions on Magnetics, 2009, vol. 45, issue 10, pp. 4376-4379.
Jung, H. et al., "The Experimental Validation of a New Energy Harvesting System Based on the Wake Galloping Phenomenon", Smart Materials and Structures, Apr. 27, 2011, vol. 20, 055022.
Blevins, Robert D. and Coughran, Charles S., "Experimental Investigation of Vortex-Induced Vibration in One and Two Dimensions with Variable Mass, Damping, and Reynolds Number", Journal of Fluids Engineering, ASME, vol. 131, Oct. 2009.

* cited by examiner

*Primary Examiner* — Vanessa Girardi
(74) *Attorney, Agent, or Firm* — Ryan J. Friedl; Kyle Eppele

(57) ABSTRACT

A system includes a housing disposed within a fluid having a fluid flow. A first member is located substantially external to the housing and is directly exposed to the fluid flow and lengthwise positioned transverse to the direction of the fluid flow. The first member is configured to vibrate independently of the housing responsive to direct exposure to the fluid flow. A coil is coupled to one end of the first member. The coil is disposed within the housing and shielded from direct fluid flow. A magnet is disposed within the housing separate from and adjacent to the coil. The magnet is shielded from direct fluid flow. Magnetic flux from the magnet induces an electric current through the coil responsive to relative motion between the magnet and the coil caused by vibration of the first member.

13 Claims, 4 Drawing Sheets

ENERGY HARVESTING SYSTEM USING FLOW-INDUCED VIBRATIONS

FEDERALLY SPONSORED RESEARCH AND DEVELOPMENT

The Energy Harvesting System Using Flow-Induced Vibrations is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case No. 101636.

BACKGROUND

Renewable energy sources are preferable for many ocean-based systems. As an example, solar, wind, and wave driven energy systems may be suitable for near-surface oceanographic sensors and monitoring stations. For submerged and ocean-floor applications however, such energy sources are not viable. Rather, geothermal, sediment, or ocean current conditions must be relied upon. Accordingly, there is a need for a compact and reliable system that can harness ocean energy to provide a renewable power source for submerged ocean-based systems.

DETAILED DESCRIPTION OF SOME EMBODIMENTS

The embodiments disclosed herein are configured to harness flow energy in a compact, easy to deploy, submerged platform by arraying a plurality of narrow diameter cantilevered cylinders to facilitate high frequency oscillations and tip displacements to drive Kinetic Energy Harvester (KEH) devices and/or components.

Figure 1:
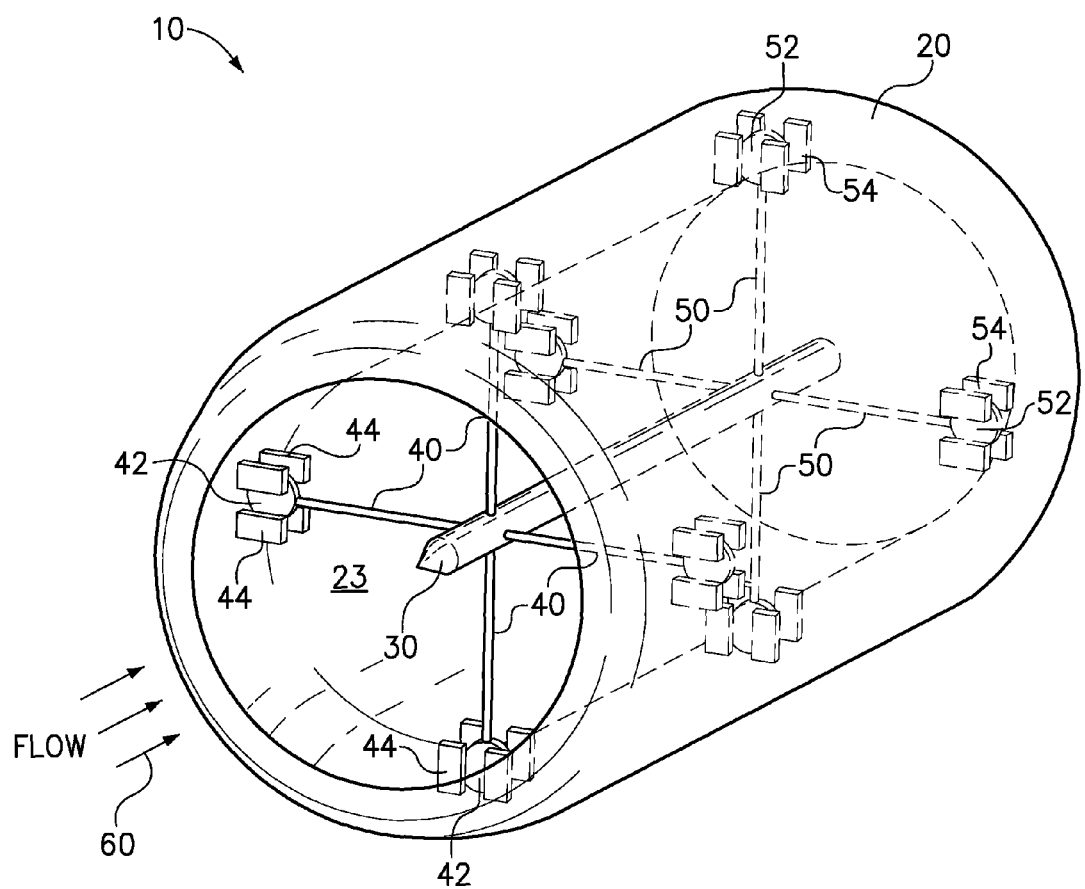
FIG. 1 shows a perspective view of an embodiment of a system in accordance with the Energy Harvesting System Using Flow-Induced Vibrations.
Figure 2:
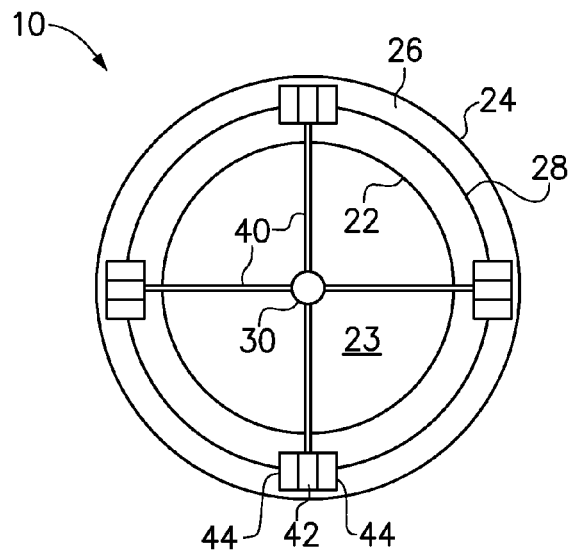
FIG. 2 shows a front view of the system shown in FIG. 1.
Figure 3:
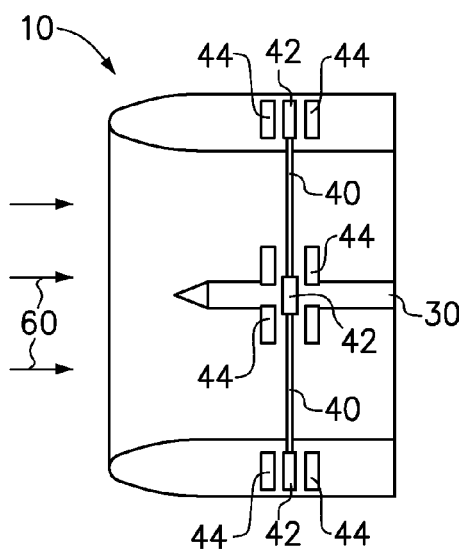
FIG. 3 shows a partial side view of the system shown in FIG. 1.

Referring to FIGS. 1-3, FIG. 1 shows a perspective view of an embodiment of a system 10 in accordance with the Energy Harvesting System Using Flow-Induced Vibrations, while FIG. 2 shows a front view of system 10 and FIG. 3 shows a partial side view of system 10. System 10 includes a housing 20 disposed within a fluid having a fluid flow direction as shown by arrows 60. As an example, and as shown in FIGS. 1-3, housing 20 is cylindrical in shape with a first (inner) wall 22 and a second (outer) wall 24. Housing 20 may be shaped to guide, concentrate and accelerate flow energy onto first members 40 and second members 50.

An interior region 26 exists between first wall 22 and second wall 24. A flow region 23 exists between first wall 22, within which fluid flow 60 is able to flow. The first wall 22 may have cut-outs or openings so that interior region 26 is free-flooded to allow fluid ingress from flow region 23, but there is little or no fluid movement in between walls 22 and 24. Fluid flow 60 may be either air flow or liquid flow, depending upon whether system 10 is in an air-based or water-based environment. If system 10 is in a water-based environment, system 10 may be tethered to an anchor or otherwise secured in place.

System 10 further includes first members 40 and second members 50 located substantially external to housing 20. First members 40 and second members 50 are located substantially within flow region 23. First members 40 and second members 50 may comprise any device that is susceptible to flow-driven vibrations. First members 40 and second members 50 may be substantially rigid, but not inflexible, and may comprise various types of materials depending upon the application. As an example, first members 40 and second members 50 may comprise a lightweight material, such as titanium, aluminum, stainless steel, copper, rubber or other synthetic and natural material blends and alloys, that can readily vibrate when exposed to direct fluid flow 60. If used in a water-based environment, first members 40 and second members 50 may also be comprised of a non-corrosive and biofouling resistant material.

First members 40 and second members 50 may have various-shaped cross-sections, such as circular, D-shaped, triangular, square, etc. Examples of first members 40 and second members 50 include, but are not limited to, a cylindrical rod, an airfoil, a cable, and a membrane. Further, first members 40 and second members 50 may be configured such that they yield one-dimensional transverse (side-to side), or two-dimensional oval, banana, or figure eight shaped vibration paths when exposed directly to fluid flow 60.

As shown, first members 40 and second members 50 are coupled to and arranged in a radial pattern about a support member 30, with second members 50 being positioned down flow from first members 40. In some embodiments, first members 40 and second members 50 may be directly coupled to support member 30. For example, first members 40 and second members 50 may be welded to support member 30. In some embodiments, first members 40 and second members 50 may be flexibly coupled to support member 30. For example, first members 40 and second members 50 may be coupled to a flexible attachment portion (not shown), which is then directly coupled to support member 30. As an example, the flexible attachment portion may comprise a flexible material. In some embodiments, the flexible attachment portion may comprise a rigid material that allows for vibratory motion of first members 40 and second members 50 in response to direct exposure to fluid flow 60.

The spacing between first members 40 and second members 50 may vary depending upon factors such as the particular configuration of system 10 and the operating environment. For example, second members 50 may be positioned at a specific distance from first members 40 to optimize the ability for flow perturbations and wake instabilities caused by first members 40 to increase the vibrations of second members 50, as well as to create and exploit wake interference effects, such as wake galloping, that can amplify flow-driven vibrations.

Support 30 is located external to housing 20, is lengthwise positioned in the direction of fluid flow 60, and is directly exposed to fluid flow 60. Support member 30 is fixed in position by stationary struts (not shown) connecting to the inner wall 22. These stationary struts can be positioned to avoid interference with first members 40 and second members 50 or perhaps even positioned itself as a fixed first member 40, lending downstream wake interference effects to second member 50. First members 40 and second members 50 are directly exposed to fluid flow 60 and are lengthwise positioned transverse to the direction of fluid flow 60. First members 40 and second members 50 are configured to vibrate independently of housing 20 responsive to direct exposure to fluid flow 60.

An energy harvesting device is positioned within housing 20 and at the distal end of first members 40 and second members 50. In some embodiments, the energy harvesting device is directly coupled to the distal end of first members 40 and second members 50. In some embodiments, first members 40 and second members 50 may extend through openings in first wall 22 such that the energy harvesting device is fully positioned within interior region 26 of housing 20 and shielded from direct fluid flow 60. The energy harvesting device may comprise various types of energy harvesting devices known in the art. In some embodiments, the energy harvesting device may be a kinetic energy harvester (KEH). In such embodiments, the KEH may comprise a coil interacting with one or more magnets.

For example, as shown in FIG. 1, a coil 42 is coupled to one end of first members 40, while a coil 52 is coupled to one end of second members 50. Coils 42 and 52 are disposed within housing 20 and shielded from direct fluid flow 60. Magnets 44 are disposed within housing 20 separate from and adjacent to coil 42 and magnets 54 are disposed within housing 20 separate from and adjacent to coil 52. Magnets 44 and 54 are shielded from direct fluid flow 60. In some embodiments, magnets 44 and 54 are secured to housing 20. In some embodiments, magnets 44 and 54 are secured, along with coils 42 and 52, to the distal end of first members 40 and second members 50, respectively.

In some embodiments, the mass of one of first members 40 and the mass of one attached coil 42 are such that a ratio of the combined masses of the first member 40 and the coil 42 to the mass of fluid displaced by both the first member 40 and the coil 42 is about 1. In some embodiments, the ratio is less than or equal to one. In some embodiments, the ratio is greater than one. A mass ratio of about 1 helps to provide lock-in performance across a broad range of flow velocities. Lock-in refers to the synchronization of structural resonance and vortex shedding frequencies which leads to high vibration amplitudes.

In operation, magnetic flux from magnets 44 induces an electric current through coils 42 responsive to relative motion between magnets 44 and coils 42 caused by vibration of first members 40. Similarly, magnetic flux from magnets 54 induces an electric current through coils 52 responsive to relative motion between magnets 54 and coils 52 caused by vibration of second members 50. The generated electric current may be used to power a system (not shown) that is electrically connected to system 10.

Figure 4:
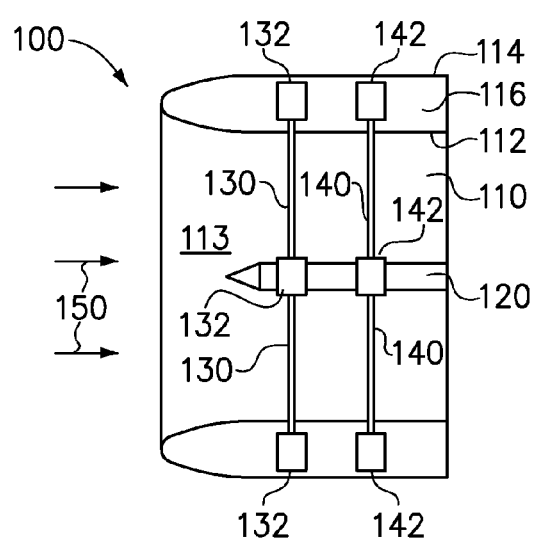
FIG. 4 shows a partial side view of another embodiment of a system in accordance with the Energy Harvesting System Using Flow-Induced Vibrations.

FIG. 4 shows a partial side view of an embodiment of a system 100 in accordance with the Energy Harvesting System Using Flow-Induced Vibrations. System 100 includes a housing 110 disposed within a fluid having a fluid flow direction as shown by arrows 150. As an example, housing 110 is configured similarly as housing 20 of system 10, and is cylindrical in shape with a first (inner) wall 112 and a second (outer) wall 114. An interior region 116 exists between first wall 112 and second wall 114. A flow region 113 exists between first wall 112, within which fluid flow 150 is able to flow. Fluid flow 150 may be either air flow or liquid flow, depending upon whether system 100 is in an air-based or water-based environment.

System 100 further includes first members 130 and second members 140 located substantially external to housing 110, located substantially within flow region 113. First members 130 and second members 140 are directly exposed to fluid flow 150 and are lengthwise positioned transverse to the direction of fluid flow 150. First members 130 and second members 140 are configured to vibrate independently of housing 110 responsive to direct exposure to fluid flow 150. First members 130 and second members 140 may be coupled to and arranged in a radial pattern about support member 120, similar to as shown for system 10 in FIG. 1.

First members 130 have a coil 132 coupled to the distal end thereof. Second members 140 have a magnet coupled to the distal end thereof. In other embodiments, first members 130 may have a magnet coupled to the distal end thereof, while second members 140 may have a coil coupled to the distal end thereof. First members 130 and second members 140 extend through openings in first wall 112 such that coils 132 and magnets 142 are fully positioned within interior region 116 of housing 110 and shielded from direct fluid flow 60.

As shown, second members 140 are located directly downstream from first members 130 at a distance such that, when coil 132 and magnet 142 move relative to each other due to vibrations of first member 130 and/or second member 140, magnetic flux from magnet 142 induces an electric current through coil 132. The generated electric current may be used to power a system (not shown) that is electrically connected to system 100.

In addition to first members 130 and second members 140 being positioned such that an electric current is generated, second members 140 may be further positioned at a specific distance from first members 130 to optimize the ability for flow perturbations and wake instabilities caused by first members 130 to increase the vibrations of second members 140.

Figure 5:
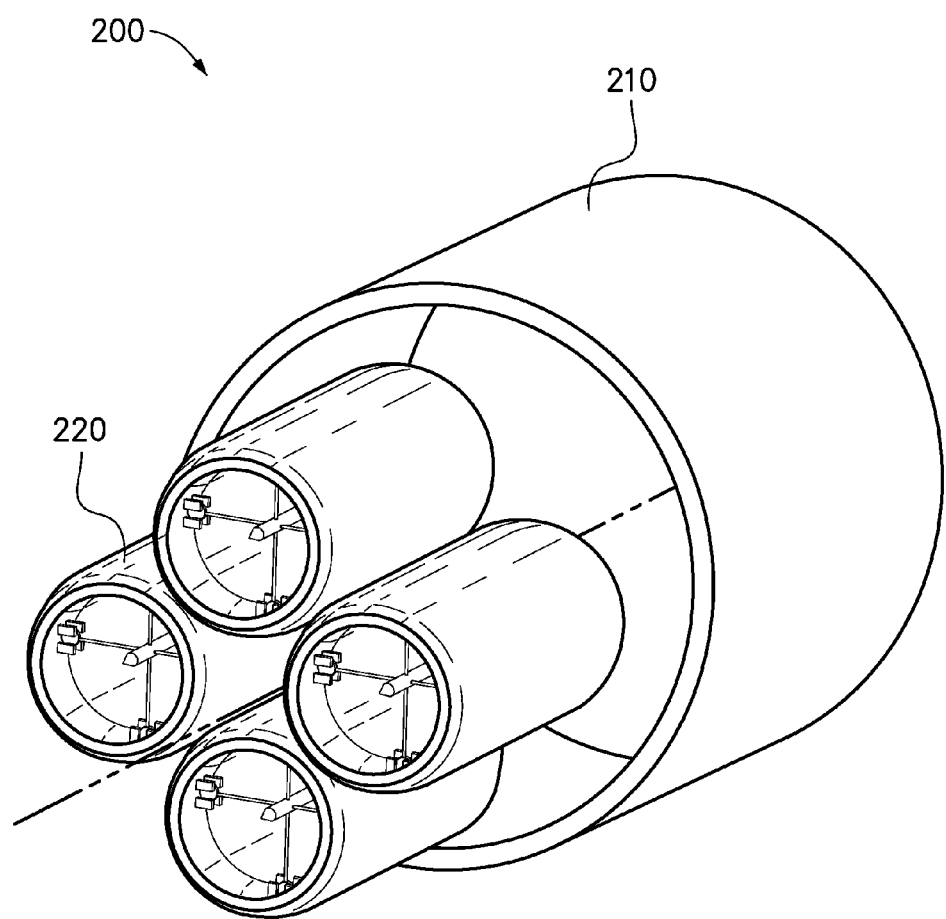
FIG. 5 shows a perspective view of another embodiment of a system in accordance with the Energy Harvesting System Using Flow-Induced Vibrations.

Referring to FIG. 5, FIG. 5 shows a perspective view of another embodiment of a system 200 in accordance with the Energy Harvesting System Using Flow-Induced Vibrations. System 200 includes a housing 210 having a plurality of energy harvesting systems 220 therein. Energy harvesting systems 220 may be configured the same as systems 10 and 100 as shown in FIGS. 1-4 herein. As shown, housing 210 is cylindrical in shape to accommodate systems 220 having cylindrical shapes. However, as recognized by one having ordinary skill in the art, housing 210 may comprise various shapes and sizes to accommodate various shaped/sized systems 220. Housing 210 may comprise various durable, lightweight materials such as fiberglass, plastics, titanium, and stainless steel. System 200 is beneficial in that it provides greater current generation capabilities than one energy harvesting system by itself.

Figure 6:
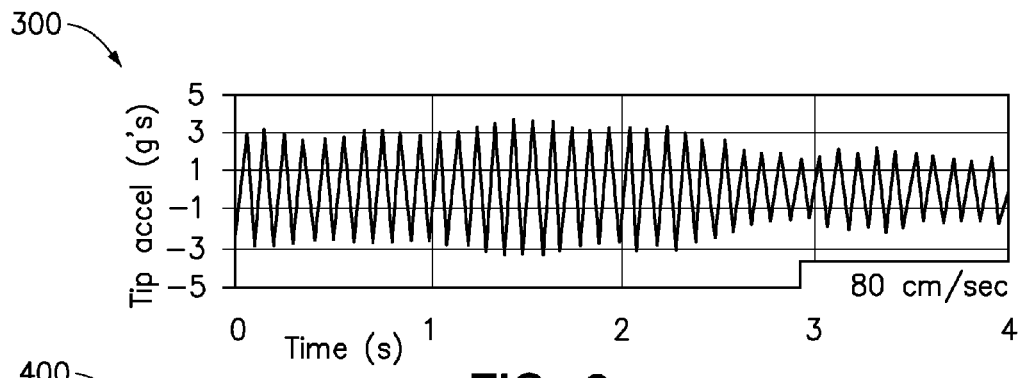
FIGS. 6-9 show graphs illustrating vibration frequency and tip acceleration vs. time for a system in accordance with the Energy Harvesting System Using Flow-Induced Vibrations.
Figure 7:
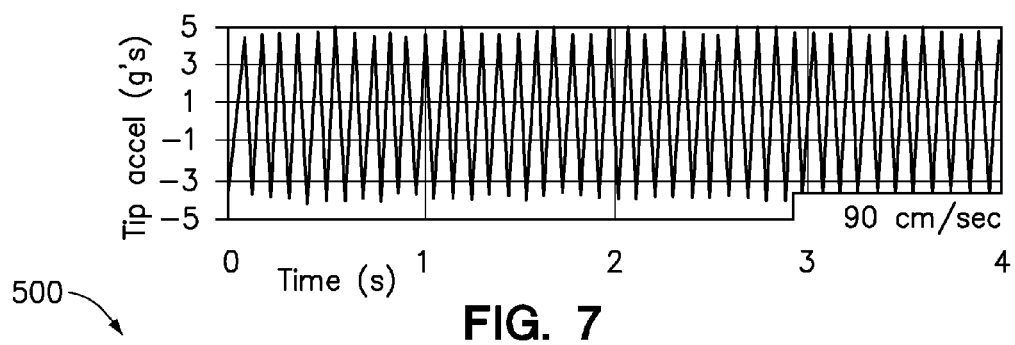
Figure 8:
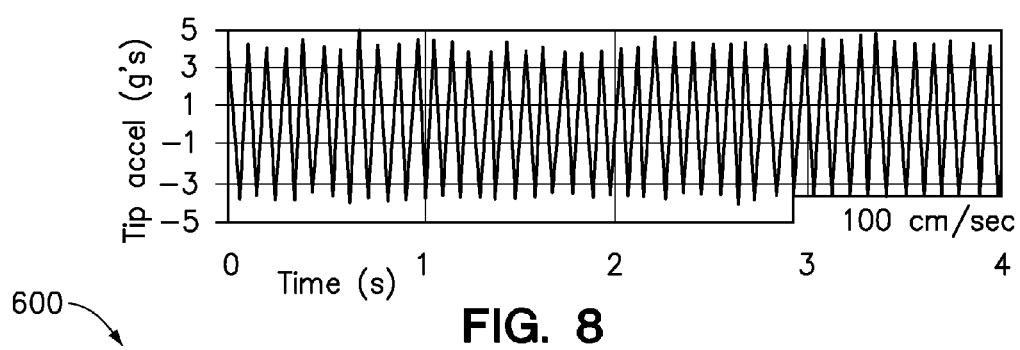
Figure 9:
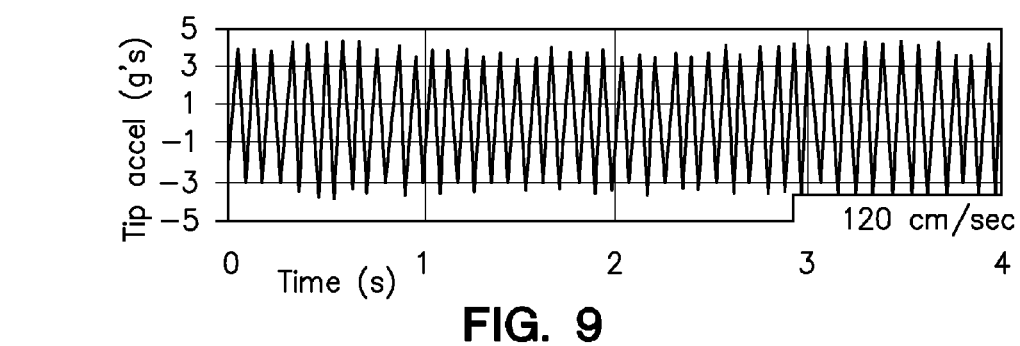

FIGS. 6-9 show graphs illustrating vibration frequency and tip acceleration vs. time for a system in accordance with the Energy Harvesting System Using Flow-Induced Vibrations. The system includes a 0.5° diameter cylindrical vibrating member having a KEH device coupled to the tip thereof. FIG. 6 shows a graph 300 of tip acceleration vs. time for a vibration frequency of 80 cm/sec. FIG. 7 shows a graph 400 of tip acceleration vs. time for a vibration frequency of 90 cm/sec. FIG. 8 shows a graph 500 of tip acceleration vs. time for a vibration frequency of 100 cm/sec. FIG. 9 shows a graph 600 of tip acceleration vs. time for a vibration frequency of 120 cm/sec.

A critical velocity, Vcrit, occurs when velocity-driven flow excitations match the structural resonance of the oscillator, such as first members 40 and second members 50. At Vcrit, significant vibrations will occur, along with a "lock-in" or "synchronization" phenomenon, whereby flow induced excitations remain locked-in at or near the oscillator resonance—even as flow velocity increases beyond Vcrit. Lock-in enables a broad regime of flow conditions in which a known and stable oscillator resonance can be exploited.

Lock-in has significant advantages for any resonance-based KEH as vibration inputs from the oscillator will remain at or near the oscillator resonance, across a wide range of flow velocities. Graphs 300-600 show vibration frequency and tip acceleration for 0.5" dia cylinder tipped with a KEH, where the traces change only gradually from 10-11 Hz and from 2 to 4 g's even after flow velocity is increased from 0.8 m/s (resonance inception) to 1.2 m/s.

Splitting the KEH device into a fixed component, such as, in some embodiments, magnets 44, and an oscillating component, such as, in some embodiments, first member 40 with coil 42 attached, allows for the reduction of the mass that must be carried by the flow-driven oscillation device (first member 40 in this example) and thus entertain higher vibration frequencies. Further, this separation also decouples any mass-spring resonance relationship between the KEH magnet and coil, allowing for power generation across a larger bandwidth of vibration input frequencies. Thus, for "lock-in" conditions in which the oscillator vibration frequency migrates slowly upward from its natural resonance, KEH power will adjust accordingly to the input vibration without any resonance relationship between the magnets and coils, such as coils 42 and 52 and magnets 44 and 54 shown in FIG. 1.

Examples of applications of that may utilize an energy harvesting system using flow-induced vibrations, such as systems 10, 100, and 200 described herein, include, but are not limited to:

Forming a wide area mesh net of flow-induced KEH devices that oscillate from wind flows to take advantage of wind energy.

Installing a wide area mesh net of flow-induced KEH devices on building tops and other architectural flow acceleration points to take advantage of wind energy.

Installing flow-induced KEH devices at the outlet of exhaust flows to power wireless devices (e.g., sensors, communication nodes) without running power lines to a traditional power source or outlet.

Installing flow-induced KEH devices in fluid pipes and conduits to power wireless devices without running power lines to a traditional power source or outlet.

Installing flow-induced KEH devices on transport vehicles or stationary platforms exposed to moving fluid (e.g., cars, buses, ships, planes, trains, submarines, offshore buoys, structures, piers) to power wireless devices, without running power lines to a traditional power source or outlet.

Installing flow-induced KEH devices on offshore or riverine platforms exposed to moving fluid to generate power for unmanned vehicles and sensors.

Many modifications and variations of the Energy Harvesting System Using Flow-Induced Vibrations are possible in light of the above description. Within the scope of the appended claims, the Energy Harvesting System Using Flow-Induced Vibrations may be practiced otherwise than as specifically described. The scope of the claims is not limited to the implementations and embodiments disclosed herein, but extends to other implementations and embodiments as may be contemplated by those having ordinary skill in the art.

We claim:

1. A system comprising:
    a housing disposed within a fluid having a fluid flow;
    a support member located external to the housing, the support member directly exposed to the fluid flow and lengthwise positioned in the direction of the fluid flow;
    a first member and a second member located substantially external to the housing, the first member and the second member directly exposed to the fluid flow and lengthwise positioned transverse to the direction of the fluid flow, the first member and the second member configured to vibrate independently of the housing responsive to direct exposure to the fluid flow, wherein a first end of the first member and a first end of the second member are flexibly coupled to the support member;
    a coil coupled to a second end of the first member, the coil disposed within the housing and shielded from direct fluid flow; and
    a magnet coupled to a second end of the second member, the magnet disposed within the housing and shielded from direct fluid flow, wherein magnetic flux from the magnet induces an electric current through the coil responsive to relative motion between the at least one magnet and the coil caused by vibration of the first member and the second member.

2. The system of claim 1, wherein the second member is located directly downstream from the first member.

3. The system of claim 1, wherein the mass of the first member and the mass of the coil are such that a ratio of the combined masses of the first member and the coil to the mass of fluid displaced by both the first member and the coil is about 1.

4. The system of claim 1, wherein the first member is rigid.

5. The system of claim 1, wherein the first member is cylindrically shaped.

6. A system comprising:
    a vibrating member directly exposed to a fluid flow, the vibrating member lengthwise positioned transverse to the direction of the fluid flow;
    at least one energy harvesting device shielded from the fluid flow, the energy harvesting device coupled to a first end of the vibrating member, wherein the mass of the vibrating member and the mass of the energy harvesting device are such that a ratio of the combined masses of the vibrating member and the energy harvesting device to the mass of fluid displaced by both the vibrating member and the energy harvesting device is about 1; and
    a support member directly exposed to the fluid flow, the support member lengthwise positioned in the direction of the fluid flow, wherein a second end of the vibrating member is flexibly coupled to the support member.

7. The system of claim 6, wherein the energy harvesting device is contained within a housing, wherein the vibrating member is located substantially external to the housing and the support member is located external to the housing, wherein the vibrating member is configured to vibrate independently of the housing responsive to direct exposure to the fluid flow.

8. The system of claim 7, wherein the energy harvesting device comprises a coil freely movable with respect to a magnet, wherein magnetic flux from the magnet induces an electric current through the coil responsive to relative motion between the magnet and the coil caused by vibration of the vibrating member.

9. The system of claim 8, wherein the coil is coupled to one end of the vibrating member and the magnet is fixed within the housing.

10. A system comprising:

a cylindrical housing disposed within a fluid having a fluid flow, the cylindrical housing having a first wall and a second wall, wherein an interior region exists between the first wall and the second wall and a flow region exists between the first wall;

a support member disposed within the flow region and directly exposed to the fluid flow, the support member lengthwise positioned in the direction of the fluid flow, the support member having a plurality of vibrating members flexibly coupled thereto and extending therefrom into the interior region, each of the vibrating members configured to vibrate independently of the housing responsive to direct exposure to the fluid flow; and a plurality of energy harvesting devices contained within the interior region, each energy harvesting device comprising a coil coupled to the distal end of one of the plurality of vibrating members, and at least one magnet located within the interior region adjacent to the coil such that magnetic flux from the at least one magnet induces an electric current through the coil responsive to relative motion between the at least one magnet and the coil.

11. The system of claim 10, wherein the plurality of vibrating members are arranged in a radial pattern about the support member.

12. The system of claim 10, wherein the at least one magnet is fixedly secured to the cylindrical housing.

13. The system of claim 10, wherein the cylindrical housing is contained within an exterior housing, the exterior housing containing a plurality of similarly-configured cylindrical housings with a support member and energy harvesting devices therein.

* * * * *